Patented Feb. 5, 1935

1,990,329

UNITED STATES PATENT OFFICE 1,990,329

FOOD PRODUCT AND METHOD

Lambert D. Johnson, Nathan F. True, and Harry H. Engel, Evansville, Ind., assignors to Mead Johnson & Company, Evansville, Ind., a corporation of Indiana No Drawing. Application May 8, 1933, Serial No. 669,932

6 Claims. (Cl. 99—10)

This invention relates to a food product and method of preparing the same, and more particularly to a dry, pre-cooked cereal adapted to be mixed with a fluid, such as milk or water, of any temperature, whereby the product is instantly converted into mushy (porridge) condition and rendered ready for consumption.

The object of the invention is to produce a cereal food in substantially dry condition, which has good keeping qualities and which has such quick absorptive powers that when stirred into a liquid of any temperature it immediately presents the appearance and has the characteristics of a cereal which has been thoroughly cooked in a double boiler.

The product of our invention is characterized by the non-lumpy, mushy, thoroughly cooked appearance it presents as soon as it is mixed with fluid. When prepared by our preferred method, it is further characterized by its initial dry, flaked, shiny appearance.

The product is palatable and suitable for consumption by adults, children and infants.

It has a well cooked taste which is superior to and readily distinguishable from the taste of the partially cooked and toasted or roasted cereal foods on the market sometimes referred to by the trade as "cold cereals," which also differ from the product of the invention by reason of their inability to instantly absorb moisture.

Our invention is not limited to any specific formula. One or more kinds of grains, either broken or ground, with or without other added ingredients may be treated as hereinafter described. Preferably we use the following formula:

| | Percent |
|---|---|
| Wheatmeal | 52.5 |
| Oatmeal | 18.0 |
| Cornmeal | 10.0 |
| Wheat germ | 15.0 |
| Sodium chloride | 0.5 |
| Alfalfa | 1.0 |
| Dried brewers yeast | 1.0 |
| Edible bonemeal | 2.0 |

In the present example, the grains are in the form of meal, and the other ingredients are fine particles or in powder form, and all are mixed together.

Preferably about one hundred and two pounds of the dry materials are mixed with thirty-five gallons of water and thoroughly cooked. We prefer to use an enclosed type cooker, the lower half of which is jacketed for the reception of steam. The mixture preferably fills only the lower half of the cooker and steam is introduced into the coker above the material to be cooked. If steam is introduced into the jacket at about seven and one-half pounds pressure and into the cooker above the mixture to be cooked at about ten pounds pressure, the cooking will be completed in about twenty minutes. Since the introduction of steam into the cooker above the mixture replaces the air, the cooking takes place in the practical absence of air; hence, by this method of cooking, there is little or no destruction of the natural vitamins of the grains as a result of oxidation.

The cooked material is then dried by any suitable dryer. Examples of dryers are spray dryer, vacuum drum dryer, vacuum shelf dryer, atmospheric shelf dryer and atmospheric drum dryer. We prefer to use an atmospheric double drum dryer. Two drums are disposed side by side, adjacent to each other and practically contacting, with their axes horizontal and parallel. The drums rotate downwardly in opposite directions. The cooked material is fed to the machined and polished cylindrical drum surfaces, preferably to the space between the upper halves of the drums, and is deposited as a thin coating on the heated drum surfaces. The space between the practically contacting surfaces of the two rolls is approximately one thirty-second to one-sixteenth inch; that is, a space sufficient to permit the cooked material to be carried in a thin uncompressed film on the rolls as their proximate surfaces move downwardly, but not so great as to allow the cooked material to flow in undesired mass downwardly between the rolls. By the time the film on each drum surface has been carried about two-thirds of a revolution of the drum, practically complete evaporation of the moisture content has taken place and the dried material is removed from the drum by a stationary scraper knife. If the temperature of the drums is too low, or the drums are revolving at too great a speed, drying is incomplete and the resultant product is gummy, whereas if the drums are too hot, the material will become more or less charred and powdered.

After removal from the dryer drums the material is in flake form. It is conveyed to a holding tank, and then is passed through a sieve or flaking device to make the flakes uniform.

The finished product prepared by our preferred method has a thoroughly cooked taste and is in the form of thin flakes, shiny in appearance. The flaked particles are dry and individual. If the cooked material is spray dried instead of drum dried, the finished product is in the form of fine globules or spheres and lacks the flaky appearance of the product as prepared by our preferred method. However, regardless of the method used in drying the cooked material, when the finished product is stirred with water of any temperature the product instantly absorbs the fluid, becomes a mush or porridge, is free from lumps and immediately presents the appearance and has the characteristics of a cereal which has been thoroughly cooked.

By "thoroughly cooked" we do not mean such prolonged cooking that digestibility is impaired thereby. Experiments have shown that when cereals such as "Cream of Wheat," whole wheat, corn meal, "Quaker Rolled Oats" and "Quick Quaker Oats" are cooked for thirty minutes a rapid increase is noted in the ease of digestibility as shown by the amount of sugar formed after the cooked cereals have been subjected to a certain digestive procedure, whereas cooking for longer than thirty minutes effected no significant increase in the amount of maltose formed except in the case of "Cream of Wheat," where there appeared to be a slight increase during a two hour cooking period. Therefore, it is to be understood that when we say our product, when mixed with fluid at any temperature, has the cooked taste, the mushy, cooked appearance and other characteristics of a thoroughly cooked cereal food, we mean the characteristc of cooked cereal foods which have not had their digestibility impaired by over-cooking and that these characteristics include the quality of easy digestibility. Without this quality the product of our invention would not be suitable for infants and invalids.

Using as a measure of starch digestibility the amount of maltose formed in cooked cereals, in a given time, when subjected to certain standard digestion procedure, considerably greater maltose production is obtained when the product of this invention is digested for a certain period than is obtained when the same digestive procedure is carried out on other cereals which have been previously cooked in a double boiler for thirty minutes or longer. For example, the average amount of maltose formed from 1 gm. of the following mentioned cereals, each first cooked for four hours and then subjected to a standard digestion procedure for thirty minutes is as follows: from "Cream of Wheat", 158 mgm.; from "Quick Quaker Oats," 149 mgm.; from "Quaker Rolled Oats," 149 mgm.; from whole wheat, 136 mgm.; and from corn meal, 152 mgm., whereas the amount of maltose formed from 1 gm. of the specially precooked product of our invention when subjected to the same standard digestion procedure for thirty minutes is 183.22 mgm. When such other cereals are cooked only thirty minutes and then subjected to the standard digestion procedure, 1 gm. of "Cream of Wheat" produces 125 mgm. of maltose, 1 gm. of "Quaker Rolled Oats" produces 133 mgm. of maltose, 1 gm. of "Quick Quaker Oats" produces 127 mgm. of maltose, 1 gm. of whole wheat produces 127 mgm. of maltose, and 1 gm. of corn meal produces 138 mgm. of maltose, as compared with 183.22 mgm. of maltose produced from 1 gm. of our precooked product subjected to the same digestion procedure.

The treatment herein described results in marked dextrinization of the starch content of the grains used in our product, and abnormal distortion of the size and shape of the starch granules, great increase in size as compared to the normal granules. An analysis of the product shows few or none of the typical or characteristic starch granules of corn, oats or wheat and few or none of the typical clumps of starch granules of said cereals. The dry flakes have a very porous structure throughout that facilitates an extremely rapid and complete absorption of fluid of any temperature, the absorption extending to the interior of the flakes, resulting in an immediate softening and expansion of the entire flake. The flakes lose their sharp outlines and tend to run together in an amorphous mass.

The precooked or partially cooked flake cereals of the prior art absorb fluid much more slowly than our product, retain their characteristic shape and remain hard and brittle for some time after wetting. Shredded cereals also retain their shape and the individual character of the particles in the shred.

As heretofore stated our product has the property of instantly absorbing moisture when mixed with fluid of any temperature. The moisture instantly and completely penetrates the flakes or particles. This results in total disintegration of the flakes or particles which constitute the finished product. The disintegration which we are able to obtain is believed to be due to the absence of typical starch granules and the absence of typical clumps of starch granules, to the fact that the original cellular structure of the cereals subjected to our process is substantially destroyed, and that the structure of the finished product is porous throughout and fragile or friable. The pores extend from the surfaces into the interiors of the flakes or particles, which causes the interiors to be wetted as quickly and thoroughly as their exteriors. The result is that a true mush or porridge, i. e. a stable suspension in which the solid matter does not settle out on standing, which is non-mucilaginous and which is free from mealy, granular, flaky and lumpy particles, is obtained by adding fluid of any temperature.

We claim:—

1. The method of preparing a dry cereal product quickly convertible into a ready-to-eat, non-granular mush or porridge by the addition of fluid of any temperature, which comprises cooking ground cereal grain in water under pressure and drying the cooked material, said steps of cooking and drying being carried on under conditions which produce dextrinization and abnormal distortion of the normal starch granules, practically complete absence of typical or characteristic starch granules and practically complete absence of clumps of starch granules and the typical cellular structure of the cereal grain.

2. The method of preparing a dry cereal product quickly convertible into a ready-to-eat, non-granular mush or porridge by the addition of fluid of any temperature, which comprises cooking ground cereal grain in water under pressure and drying the cooked material in a thin film, said steps of cooking and drying being carried on under conditions which produce dextrinization and abnormal distortion of the normal starch granules, practically complete absence of typical or characteristic starch granules and practically complete absence of clumps of starch granules and the typical cellular structure of the cereal grain.

3. The method of preparing a dry cereal product quickly convertible into a ready-to-eat mush or porridge by the addition of fluid of any temperature, which comprises thoroughly cooking approximately one hundred pounds of ground cereal grain in approximately thirty-five gallons of water under pressure, and drying the cooked material, said cooking and drying being carried on under conditions which produce dextrinization and distortion of starch granules to produce substantially complete absence of typical or characteristic starch granules and practically complete absence of clumps of starch granules and the typical cellular structure of the cereal grain and a porous friable structure in the finished product.

4. The method of preparing a dry cereal product quickly convertible into a ready-to-eat mush or porridge by the addition of fluid of any temperature, which comprises thoroughly cooking approximately one hundred pounds of ground cereal grain in approximately thirty-five gallons of water for about twenty minutes under approximately ten pounds steam pressure introduced into the cooking vessel, and drying the cooked material, said cooking and drying being carried on under conditions which produce dextrinization and distortion of starch granules to produce substantially complete absence of typical or characteristic starch granules and practically complete absence of clumps of starch granules and the typical cellular structure of the cereal grain and a porous friable structure in the finished product.

5. A dry, pre-cooked cereal product suitable for infant feeding consisting of particles having porous construction throughout, and extremely quick fluid absorptive properties, being quickly convertible by the addition of fluid of any temperature into a stable suspension, and having the taste, appearance and physical characteristics of a readily digestible cooked cereal, said product being further characterized by dextrinization and abnormal distortion of the starch granules, by practically complete absence of clumps of starch granules, and by practically complete absence of typical or characteristic starch granules of the grain used in the product.

6. A dry, pre-cooked cereal product consisting of particles having porous construction throughout, the walls defining the pores being thin and fragile, and having extremely quick fluid absorptive properties, being quickly convertible by the addition of fluid of any temperature into a mush or porridge free from lumps, and having the taste, appearance and physical characteristics of a readily digestible cooked cereal, said product being further characterized by dextrinization and abnormal distortion of the starch granules, by total disintegration after being wetted, by practically complete absence of clumps of starch granules, and by practically complete absence of typical or characteristic starch granules of the grains used in the product.

NATHAN F. TRUE.
LAMBERT D. JOHNSON.
HARRY H. ENGEL.

CERTIFICATE OF CORRECTION.

Patent No. 1,990,329.  February 5, 1935.

LAMBERT D. JOHNSON, ET AL.

It is hereby certified that error appears in the printed specification of the above numbered patent requiring correction as follows: Page 2, second column, after line 43, insert the following paragraphs:

Our product has the advantage that any needed quantity may be readily and conveniently prepared for consumption without the use of cooking utensils. It obviates the difficulty of keeping without spoilage the pre-cooked moist foods of the prior art, and has quick absorbent properties not found in partially pre-cooked dry foods of the prior art. Infants require thoroughly cooked cereals. To thoroughly cook a small quantity of cereal results in waste of time and money. Our improved product may be prepared for use in any desired quantity, no matter how small, and consequently there is no waste in the use of same.

It will be understood that when "ground" cereal grain is referred to in the claims, said words are intended to include ground or broken cereal grain.

And that the said Letters Patent should be read with this correction therein that the same may conform to the record of the case in the Patent Office.

Signed and sealed this 25th day of June, A. D. 1935.

Bryan M. Battey
Acting Commissioner of Patents.

(Seal)

DISCLAIMER 1,990,329.—*Lambert D. Johnson, Nathan F. True,* and *Harry H. Engel,* Evansville, Ind. FOOD PRODUCT AND METHOD. Patent dated February 5, 1935. Disclaimer filed May 13, 1942, by the assignee, *Mead Johnson & Company.*

Hereby enters this disclaimer to the following portions of the specification—

Page 1, second column, line 16, "spray dryer,"

Page 1, second column, lines 17 and 18, ", vacuum shelf dryer, atmospheric shelf dryer", Page 1, second column, line 55, to page 2, first column, lines 1 to 12, inclusive, "If the cooked material is spray dried instead of drum dried, the finished product is in the form of fine globules or spheres and lacks the flaky appearance of the product as prepared by our preferred method. However, regardless of the method used in drying the cooked material, when the finished product is stirred with water of any temperature the product instantly absorbs the fluid, becomes a mush or porridge, is free from lumps, and immediately presents the appearance and has the characteristics of a cereal which has been thoroughly cooked."

[*Official Gazette June 2, 1942.*]

DISCLAIMER 1,990,329.—*Lambert D. Johnson*, *Nathan F. True*, and *Harry H. Engel*, Evansville, Ind. FOOD PRODUCT AND METHOD. Patent dated Feb. 5, 1935. Disclaimer filed July 15, 1947, by the assignee, *Mead Johnson & Company*.

Hereby enters this disclaimer of claims 5 and 6 of said patent.

[*Official Gazette August 19, 1947.*]